(12) United States Patent
Hayashi

(10) Patent No.: US 9,355,505 B2
(45) Date of Patent: May 31, 2016

(54) VEHICLE DIAGNOSIS APPARATUS

(71) Applicant: DENSO CORPORATION, Kariya, Aichi-pref. (JP)

(72) Inventor: Tsutomu Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/434,531

(22) PCT Filed: Oct. 4, 2013

(86) PCT No.: PCT/JP2013/005942
§ 371 (c)(1),
(2) Date: Apr. 9, 2015

(87) PCT Pub. No.: WO2014/057644
PCT Pub. Date: Apr. 17, 2014

(65) Prior Publication Data
US 2015/0228131 A1    Aug. 13, 2015

(30) Foreign Application Priority Data
Oct. 10, 2012 (JP) ................................. 2012-225055

(51) Int. Cl.
*G06F 19/00* (2011.01)
*G07C 5/08* (2006.01)
(Continued)

(52) U.S. Cl.
CPC ............ *G07C 5/0808* (2013.01); *B60R 16/02* (2013.01); *B60R 16/0234* (2013.01); *G01M 17/007* (2013.01); *G07C 5/00* (2013.01)

(58) Field of Classification Search
CPC .......... G07C 5/08; G07C 5/00; G07C 5/0808; B60R 16/02; B60R 16/0234
USPC ......... 701/29.1, 31.4, 33.4; 340/505; 709/218
See application file for complete search history.

(56) References Cited

U.S. PATENT DOCUMENTS

| | | | | |
|---|---|---|---|---|
| 6,225,898 B1 * | 5/2001 | Kamiya | ................. | G07C 5/008 340/10.1 |
| 2002/0044049 A1 * | 4/2002 | Saito | ................. | B60G 17/0185 340/438 |

(Continued)

FOREIGN PATENT DOCUMENTS

| | | | |
|---|---|---|---|
| JP | H06160245 A | 6/1994 |
| JP | 2001349807 A | 12/2001 |

(Continued)

OTHER PUBLICATIONS

International Search Report and Written Opinion (in Japanese with English Translation) for PCT/JP2013/005942, mailed Dec. 10, 2013; ISA/JP.

*Primary Examiner* — McDieunel Marc
(74) *Attorney, Agent, or Firm* — Harness, Dickey & Pierce, P.L.C.

(57) ABSTRACT

A vehicle diagnosis apparatus includes an accumulation unit and a storage control unit. The accumulation unit cumulatively adds a numerical value indicating a normal operation history of each normal operation made to a vehicle to an initialized cumulative total value having a predetermined number of digits, during a time period from an assembly of a vehicle component to an actual use of the vehicle, and stores the cumulative total value in a non-volatile storage unit. The storage control unit, in response to an abnormality occurrence in the vehicle, stores a corresponding diagnosis code in the non-volatile storage unit. The accumulation unit further cumulatively adds a numerical value indicating the abnormality occurrence to the cumulative total value. The storage control unit stores, in the non-volatile storage unit, the diagnosis code indicating the abnormality occurrence in association with the cumulative total value.

4 Claims, 14 Drawing Sheets

(51) Int. Cl.
*B60R 16/02* (2006.01)
*B60R 16/023* (2006.01)
*G01M 17/007* (2006.01)
*G07C 5/00* (2006.01)

(56) References Cited

U.S. PATENT DOCUMENTS

| | | | | |
|---|---|---|---|---|
| 2002/0087238 | A1* | 7/2002 | Matsui | G01M 17/007 701/31.4 |
| 2005/0065679 | A1* | 3/2005 | Kawauchi | G07C 5/085 701/33.4 |
| 2005/0192722 | A1* | 9/2005 | Noguchi | G05B 23/0264 701/33.4 |
| 2005/0192723 | A1* | 9/2005 | Noguchi | G07C 5/085 701/33.4 |
| 2009/0216399 | A1* | 8/2009 | Ishikawa | G07C 5/0808 701/31.4 |
| 2010/0324777 | A1* | 12/2010 | Tominaga | G07C 5/0808 701/31.4 |
| 2011/0238262 | A1* | 9/2011 | Fukuta | B60W 50/045 701/33.4 |
| 2012/0113773 | A1* | 5/2012 | Matsuo | G07C 5/085 369/21 |
| 2013/0159466 | A1* | 6/2013 | Mao | H04L 67/12 709/218 |
| 2014/0121888 | A1* | 5/2014 | Guo | G07C 5/008 701/31.4 |
| 2014/0189814 | A1* | 7/2014 | Marten | G07C 5/008 726/4 |

FOREIGN PATENT DOCUMENTS

JP 3379260 B2 2/2003
JP 2009074998 A 4/2009

* cited by examiner

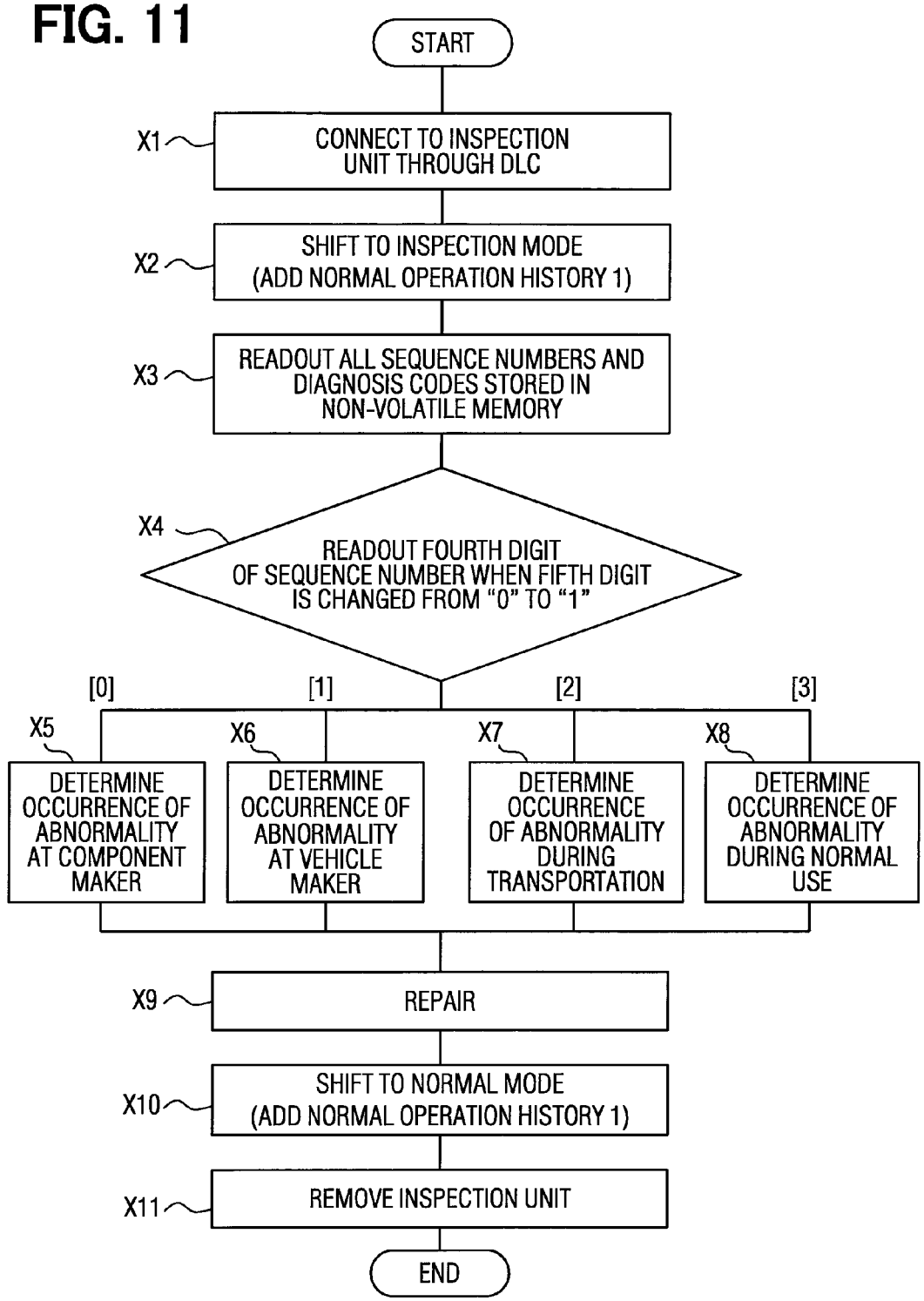

FIG. 12
ABNORMALITY OCCURRED AT COMPONENT MAKER

| CUMULATIVE TOTAL VALUE (SEQUENCE NUMBER) | DIAGNOSIS CODE | ADDED VALUE | HISTORY |
|---|---|---|---|
| 00000 | | – | – |
| 00001 | | 1 | NORMAL OPERATION HISTORY |
| 10002 | DIGX1 | 10001 | OCCURRENCE OF ABNORMALITY |
| 10003 | | 1 | NORMAL OPERATION HISTORY |
| 11004 | | 1001 | SHIPMENT FROM COMPONENT MAKER |
| 11005 | | 1 | NORMAL OPERATION HISTORY |
| 11006 | | 1 | NORMAL OPERATION HISTORY |
| 11007 | | 1 | NORMAL OPERATION HISTORY |
| 11008 | | 1 | NORMAL OPERATION HISTORY |
| 12009 | | 1001 | SHIPMENT FROM VEHICLE MAKER |
| 12010 | | 1 | NORMAL OPERATION HISTORY |
| 12011 | | 1 | NORMAL OPERATION HISTORY |
| 13012 | | 1001 | INITIATION OF COMMUNICATION |

FIG. 13
ABNORMALITY OCCURRED AT VEHICLE MAKER

| CUMULATIVE TOTAL VALUE (SEQUENCE NUMBER) | DIAGNOSIS CODE | ADDED VALUE | HISTORY |
|---|---|---|---|
| 00000 | | – | – |
| 00001 | | 1 | NORMAL OPERATION HISTORY |
| 00002 | | 1 | NORMAL OPERATION HISTORY |
| 00003 | | 1 | NORMAL OPERATION HISTORY |
| 01004 | | 1001 | SHIPMENT FROM COMPONENT MAKER |
| 01005 | | 1 | NORMAL OPERATION HISTORY |
| 11006 | DIGX2 | 10001 | OCCURRENCE OF ABNORMALITY |
| 11007 | | 1 | NORMAL OPERATION HISTORY |
| 11008 | | 1 | NORMAL OPERATION HISTORY |
| 12009 | | 1001 | SHIPMENT FROM VEHICLE MAKER |
| 12010 | | 1 | NORMAL OPERATION HISTORY |
| 12011 | | 1 | NORMAL OPERATION HISTORY |
| 13012 | | 1001 | INITIATION OF COMMUNICATION |

FIG. 14
ABNORMALITY OCCURRED DURING TRANSPORTATION

| CUMULATIVE TOTAL VALUE (SEQUENCE NUMBER) | DIAGNOSIS CODE | ADDED VALUE | HISTORY |
|---|---|---|---|
| 00000 | | – | – |
| 00001 | | 1 | NORMAL OPERATION HISTORY |
| 00002 | | 1 | NORMAL OPERATION HISTORY |
| 01003 | | 1001 | SHIPMENT FROM COMPONENT MAKER |
| 01004 | | 1 | NORMAL OPERATION HISTORY |
| 01005 | | 1 | NORMAL OPERATION HISTORY |
| 01006 | | 1 | NORMAL OPERATION HISTORY |
| 01007 | | 1 | NORMAL OPERATION HISTORY |
| 02008 | | 1001 | SHIPMENT FROM VEHICLE MAKER |
| 02009 | | 1 | NORMAL OPERATION HISTORY |
| 12010 | DIGX3 | 10001 | OCCURRENCE OF ABNORMALITY |
| 12011 | | 1 | NORMAL OPERATION HISTORY |
| 13012 | | 1001 | INITIATION OF COMMUNICATION |
| 13013 | | 1 | NORMAL OPERATION HISTORY |

FIG. 15
ABNORMALITY OCCURRED DURING NORMAL USE

| CUMULATIVE TOTAL VALUE (SEQUENCE NUMBER) | DIAGNOSIS CODE | ADDED VALUE | HISTORY |
|---|---|---|---|
| 00000 | | – | – |
| 00001 | | 1 | NORMAL OPERATION HISTORY |
| 00002 | | 1 | NORMAL OPERATION HISTORY |
| 01003 | | 1001 | SHIPMENT FROM COMPONENT MAKER |
| 01004 | | 1 | NORMAL OPERATION HISTORY |
| 01005 | | 1 | NORMAL OPERATION HISTORY |
| 01006 | | 1 | NORMAL OPERATION HISTORY |
| 01007 | | 1 | NORMAL OPERATION HISTORY |
| 02008 | | 1001 | SHIPMENT FROM VEHICLE MAKER |
| 02009 | | 1 | NORMAL OPERATION HISTORY |
| 02010 | | 1 | NORMAL OPERATION HISTORY |
| 02011 | | 1 | NORMAL OPERATION HISTORY |
| 03012 | | 1001 | INITIATION OF COMMUNICATION |
| 13013 | DIGX4 | 10001 | OCCURRENCE OF ABNORMALITY |

FIG. 16

MULTIPLE ABNORMALITY OCCURRENCES

| CUMULATIVE TOTAL VALUE (SEQUENCE NUMBER) | DIAGNOSIS CODE | ADDED VALUE | HISTORY |
|---|---|---|---|
| 00000 | | – | – |
| 00001 | | 1 | NORMAL OPERATION HISTORY |
| 00002 | | 1 | NORMAL OPERATION HISTORY |
| 01003 | | 1001 | SHIPMENT FROM COMPONENT MAKER |
| 01004 | | 1 | NORMAL OPERATION HISTORY |
| 01005 | | 1 | NORMAL OPERATION HISTORY |
| 01006 | | 1 | NORMAL OPERATION HISTORY |
| 01007 | | 1 | NORMAL OPERATION HISTORY |
| 02008 | | 1001 | SHIPMENT FROM VEHICLE MAKER |
| 02009 | | 1 | NORMAL OPERATION HISTORY |
| 12010 | DIGX5 | 10001 | OCCURRENCE OF ABNORMALITY |
| 12011 | | 1 | NORMAL OPERATION HISTORY |
| 13012 | | 1001 | INITIATION OF COMMUNICATION |
| 23013 | DIGX6 | 10001 | OCCURRENCE OF ABNORMALITY |

VEHICLE DIAGNOSIS APPARATUS

CROSS REFERENCE TO RELATED APPLICATIONS

This application is a U.S. National Phase Application under 35 U.S.C. 371 of International Application No. PCT/JP2013/005942 filed on Oct. 4, 2013 and published in Japanese as WO 2014/057644 A1 on Apr. 17, 2014. This application is based on and claims the benefit of priority from Japanese Patent Application No. 2012-225055 filed on Oct. 10, 2012. The entire disclosures of all of the above applications are incorporated herein by reference.

TECHNICAL FIELD

The present disclosure relates to a vehicle diagnosis apparatus having a function of storing various abnormal states of a vehicle as diagnosis codes corresponding to the abnormal states.

BACKGROUND ART

For example, in the event of abnormality in a vehicle, an electronic control unit (hereinafter referred to as ECU) stores a diagnosis code corresponding to the abnormal state in a memory. In general, when an ECU stores a diagnosis code in a memory, the ECU stores the time of occurrence of abnormality together with the diagnosis code. This aims at maximally facilitating the identification of the cause of the abnormality.

When the time of occurrence of the abnormality has been recorded in the memory, it is easier to find out the situation at the occurrence time of the abnormality, the action taken by the user on a product of concern, and the like. However, to provide the ECU with such a time keeping function, it is necessary to embed a dedicated clock circuit in the ECU.

To solve above-described problem, a technical idea has been provided which cumulatively adds up the periods during which power is supplied from a vehicle-mounted battery as a result of closing the ignition switch of a vehicle and stores, on the occurrence of an abnormal state, a diagnosis code corresponding to the abnormality and the cumulative total value of the power supply periods at an occurrence time of the abnormality (see, e.g., Patent Literature 1).

The technique described in Patent Literature 1 also provides a technical idea which counts up the number of times the ignition switch of a vehicle is operated and stores, on the occurrence of an abnormal state, a diagnosis code corresponding to the abnormality and the cumulative total value of the counted numbers of operations at that time.

However, during the period, e.g., from the component assembly of a vehicle to the actual use of the vehicle, it is difficult to know the time when an abnormal state occurred in the vehicle using an electronic control unit. For example, when a method which adds up the power supply periods using the technique described in Patent Literature 1 is used, a timer function which requires a firm power source is needed and a timer needs to be activated.

Even in the case of using, e.g., a method which adds up the counted numbers of operations performed on the ignition switch, when, e.g., abnormalities corresponding to multiple abnormality codes have occurred in response to one operation of turning on or turning off the ignition switch, it is difficult to know the order of occurrence of the abnormalities. That is, when abnormalities corresponding to two types of diagnosis codes A and B occur, the order of occurrence of the abnormalities may be important in such a case where the occurrence of abnormalities in the order of A and B is normal, while the occurrence of abnormalities in the order of B and A is abnormal.

PRIOR ART LITERATURE

Patent Literature

Patent Literature 1: JP 3379260 B2

SUMMARY OF INVENTION

In view of the foregoing difficulties, it is an object of the present disclosure to provide a vehicle diagnosis apparatus which is able to easily identify an abnormality occurrence timing and an occurrence order of abnormalities without providing a time keeping function such as a timer.

According to an aspect of the present disclosure, a vehicle diagnosis apparatus includes an accumulation unit and a storage control unit. The accumulation unit cumulatively adds a numerical value indicating a normal operation history of each normal operation made to a vehicle to a cumulative total value, which is initialized and has a predetermined number of digits, during a time period from an assembly of a vehicle component to an actual use of the vehicle. Then, the accumulation unit stores the cumulative total value to which the numerical value indicating each normal operation history is added in a non-volatile storage unit. The storage control unit, in response to an occurrence of an abnormality in the vehicle, stores a diagnosis code corresponding to the occurrence of the abnormality in the non-volatile storage unit. The accumulation unit cumulatively adds a numerical value indicating the occurrence of the abnormality to the cumulative total value stored in the non-volatile storage unit. The storage control unit stores, in the non-volatile storage unit, the diagnosis code corresponding to the occurrence of the abnormality in association with the cumulative total value to which the numerical value indicating the occurrence of the abnormality is added.

With the above apparatus, the occurrence time of each abnormality and the occurrence order of the abnormalities can be easily identified without adding a time keeping function, such as a timer to the apparatus.

BRIEF DESCRIPTION OF DRAWINGS

The above and other objects, features and advantages of the present disclosure will become more apparent from the following detailed description made with reference to the accompanying drawings. In the drawings:

FIG. 11 is a flow chart showing a determination method for an abnormality occurrence timing;

FIG. 12 shows an example (first example) of the sequence number and a diagnosis code which are stored in a non-volatile memory;

FIG. 13 shows an example (second example) of the sequence number and the diagnosis code which are stored in the non-volatile memory;

FIG. 14 shows an example (third example) of the sequence number and the diagnosis code which are stored in the non-volatile memory;

FIG. 15 shows an example (fourth example) of the sequence number and the diagnosis code which are stored in the non-volatile memory; and FIG. 16 shows an example (fifth example) of the sequence number and the diagnosis code which are stored in the non-volatile memory.

EMBODIMENTS FOR CARRYING OUT INVENTION

Figure 1:
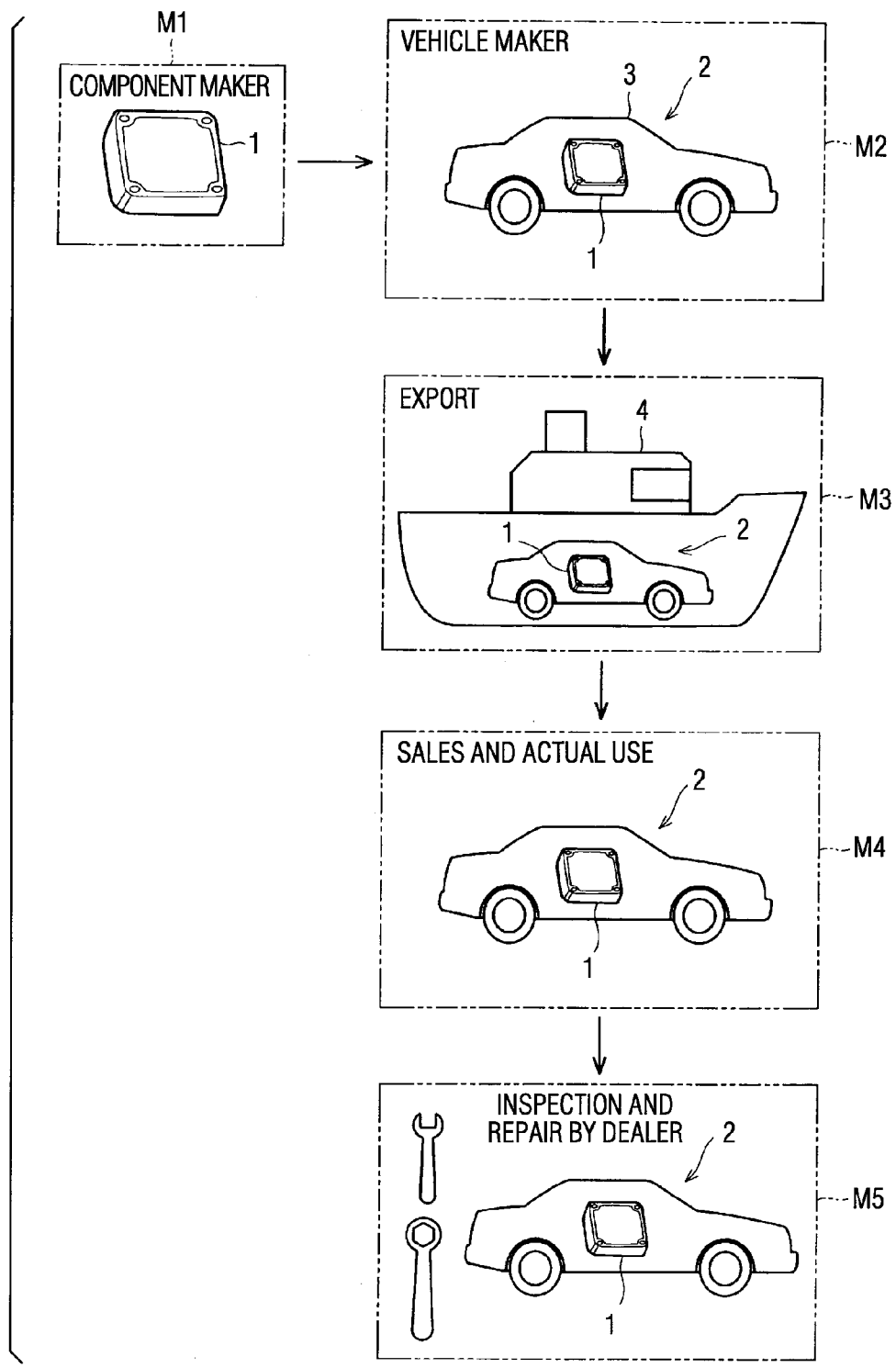
FIG. 1 is a diagram illustrating the assembly of a vehicle and a form of export of the vehicle which are shown with regard to an embodiment of the present disclosure.

The following will describe an embodiment of the present disclosure with reference to the drawings. FIG. 1 schematically shows a sequential flow related to the sales of a product of an electronic control unit (hereinafter referred to as ECU), production and distribution of a vehicle, and various maintenance of a vehicle. A component maker M1 assembles various electronic components to produce an ECU 1 and inspects the ECU 1 in the production process of the ECU1.

The component maker M1 ships a finished product of the ECU 1 to a vehicle maker M2. The vehicle maker M2 prepares a vehicle body 3 of a vehicle 2, assembles various components such as the ECU 1 into the vehicle body 3, performs an inspection or the like, and ships the vehicle 2. When an exporter M3 exports the vehicle 2, the exporter M3 mounts the vehicle 2 in a transportation means 4 such as a transportation vessel and exports the vehicle 2. When the vehicle 2 has arrived at an export destination, the vehicle 2 is sold by a dealer M5 to a user M4 and actually used by the user M4. Thereafter, the dealer M5 or the like performs checkup, maintenance, and repair of the vehicle 2. The characteristic feature of the present embodiment is the operation of the ECU 1 in such a sequential flow.

Figure 2:
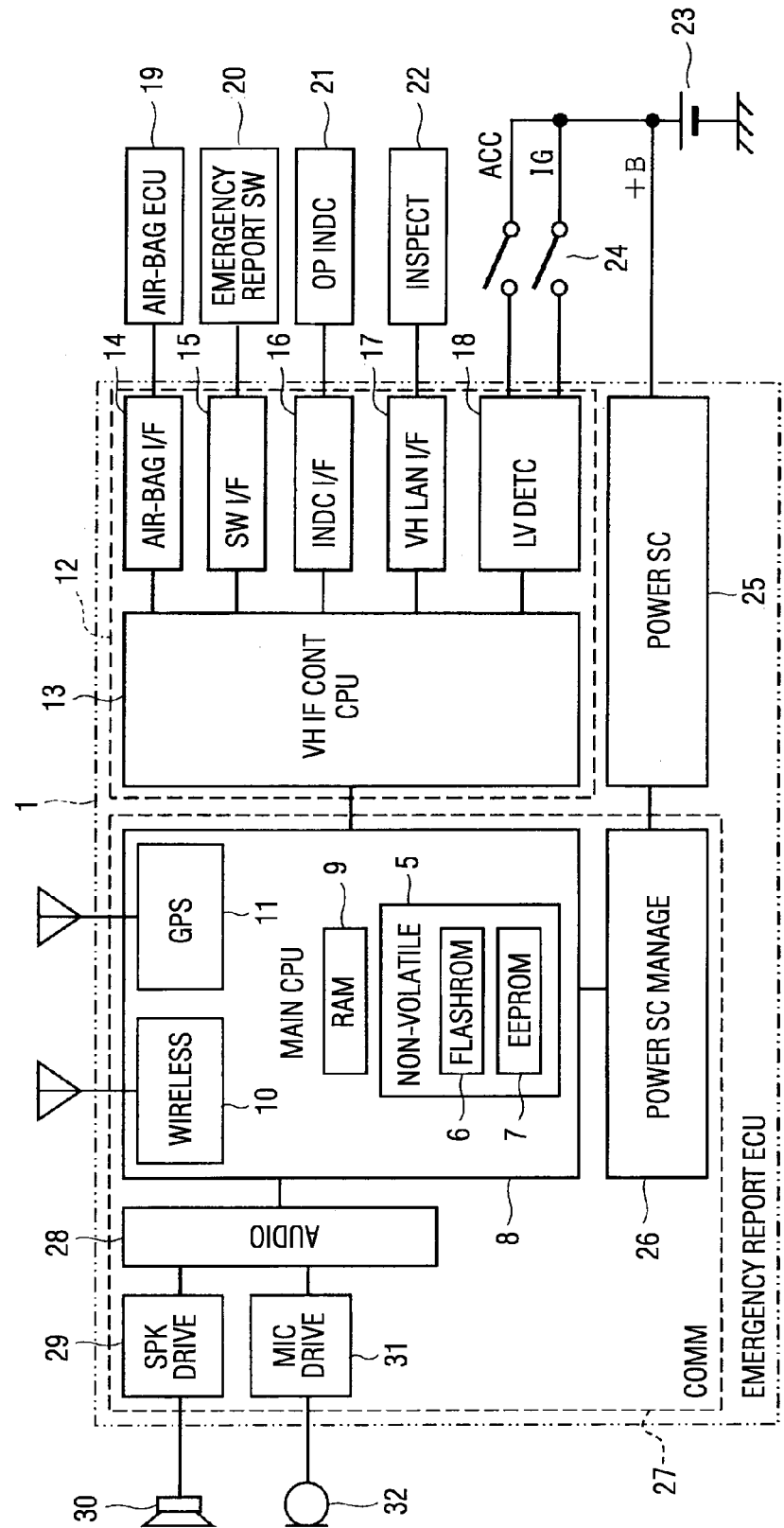
FIG. 2 is a block diagram schematically showing an electric configuration of each of an electronic control unit and peripheral units of the electronic control unit.

The present embodiment will describe the ECU 1 for emergency report purpose as an example of a vehicle diagnosis apparatus. FIG. 2 is a block diagram showing an electric configuration of the ECU 1. The ECU 1 mainly includes a main central processing unit (hereinafter referred to as CPU) 8. In the main CPU 8, a flash Read-Only Memory (ROM) 6 and an Electrically Erasable Programmable Read-Only Memory (EEPROM) 7, each serving as a non-volatile memory (NON-VOLATILE) 5, are embedded. In the main CPU 8, a Random Access Memory (RAM) 9, a wireless transmission reception unit (WIRELESS) 10, and a Global Positioning System (GPS) signal processing unit (GPS) 11 are additionally embedded.

Figure 4:
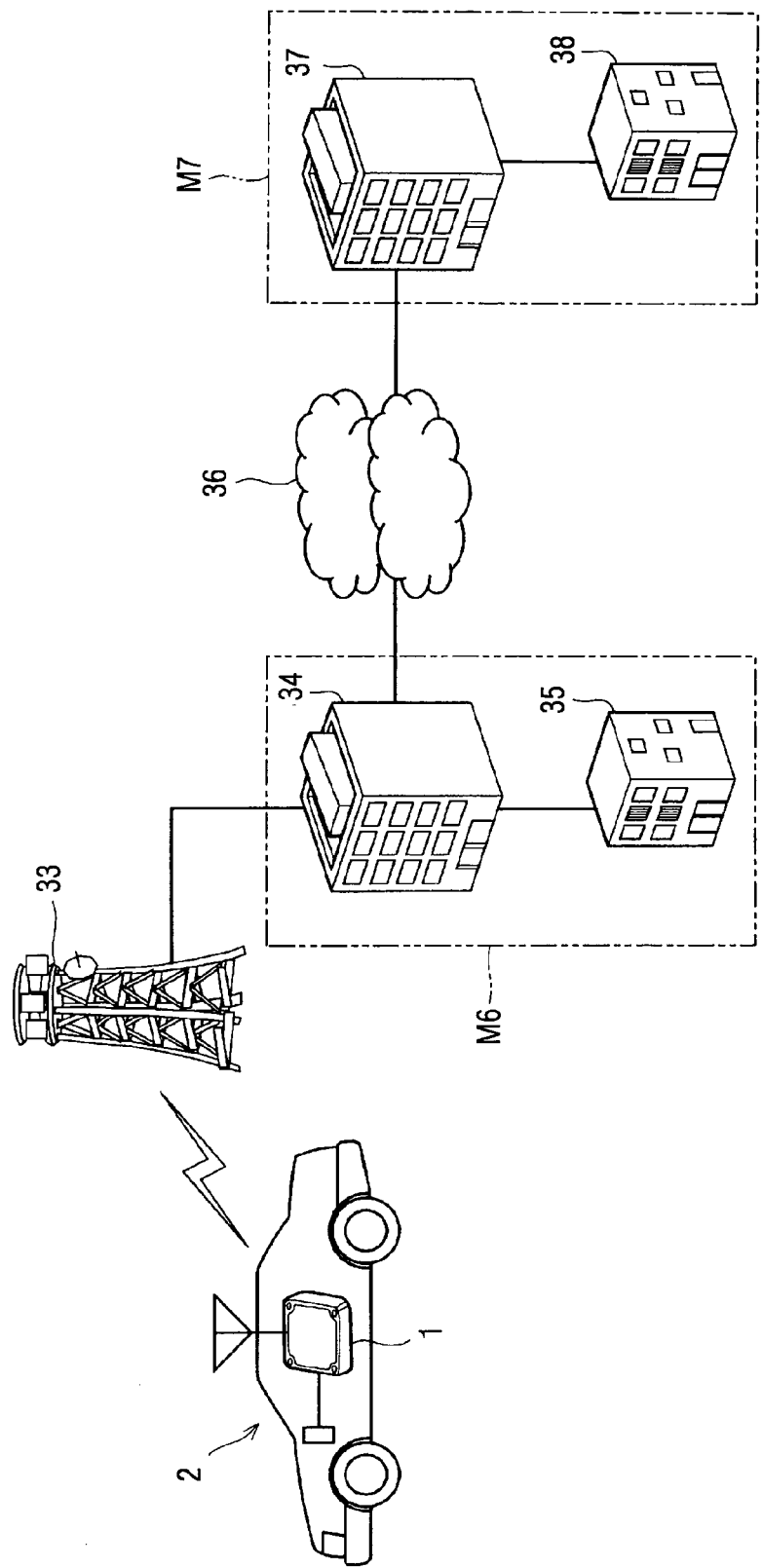
FIG. 4 is an illustrative diagram showing a communication form at an export destination.

The wireless transmission reception unit 10 is a communication module based on a communication standard (which is, e.g., cdma2000 in the United States) in a foreign country (country A) other than Japan, which allows communication between the ECU 1 and a base station 33 (see FIG. 4). The GPS signal processing unit 11 receives a GPS signal from a GPS satellite to acquire current location information. The main CPU 8 performs various processes in response to a communication signal from the wireless transmission reception unit 10 and a processing signal from the GPS signal processing unit 11.

In the ECU 1, an interface unit (I/F) 12 is also mounted. The interface unit 12 performs input/output processes with another ECU, a switch, an actuator, a sensor, and an external device. The interface unit 12 is divided into individual functional blocks such as, e.g., a vehicle I/F control CPU (VH I/F CONT CPU) 13, an air bag I/F unit (AIR-BAG I/F) 14, a switch I/F unit (SW I/F) 15, an indicator I/F unit (INDC I/F) 16, a vehicle-mounted Local Area Network (LAN) I/F unit (VH LAN I/F) 17, and a level detection unit (LV DETC) 18. Among these I/F units, the vehicle I/F control CPU 13 is the main functional block. The vehicle I/F control CPU 13 performs interface processing between each of the units 14 to 18 and the main CPU 8.

The air bag I/F unit 14 is connected to an air bag ECU 19 disposed outside of the ECU 1. The air bag ECU 19 normally transmits a normal signal to the ECU 1 when an air bag (not shown) is not performing a deploying operation and transmits an abnormal signal to the ECU 1 when any abnormality has occurred in the air bag. The air bag ECU 19 also transmits, through the interface unit 12, an airbag deployment signal to the emergency report ECU 1 in the event of collision between the vehicle 2 and an obstacle.

The switch I/F unit 15 is connected to an emergency report switch (EMERGENCY REPORT SW) 20 disposed outside of the ECU 1. Normally, when the emergency report switch 20 is not operated, the switch I/F unit 15 outputs a normal operation signal to the ECU 1 (vehicle I/F control CPU 13). When a communication line to the emergency report switch 20 comes off or is disconnected, the switch I/F unit 15 outputs, to the ECU 1, the abnormal signal indicating an abnormal connection (vehicle I/F control CPU 13). When the emergency report switch 20 is operated by the user, the switch I/F unit 15 receives a signal indicating the operation of the emergency report switch 20 by the user and transmits an emergency report signal to the main CPU 8 of the ECU 1.

An operation indicator (OP INDC) 21 receives, through the indicator I/F unit 16, the operation state of the emergency report ECU 1 and the connection state of peripheral units from the vehicle I/F control CPU 13 and reports the received states to the user. An inspection unit (INSPECT) 22 is a device which inspects the ECU 1 and is connectable to the ECU 1 through the vehicle-mounted LAN I/F unit 17. The vehicle-mounted I/F unit 17 is an interface for connection to an in-vehicle network based on, e.g., a Controller Area Network (CAN) or the ISO 14230 standard.

The inspection unit 22 is provided at the component maker M1, the vehicle maker M2, the dealer M5, or the like and connected to the in-vehicle network when inspecting the ECU 1 or the like. The level detection unit 18 detects a vehicle accessory (ACC) signal and an ignition (IG) signal from a vehicle-mounted battery 23 through an ignition switch 24.

When the ECU 1 is assembled, together with the vehicle-mounted battery 23, to the vehicle body 3, the ECU 1 is supplied with power from the vehicle-mounted battery 23 through a power source unit 25. The power source unit 25 converts the voltage of the vehicle-mounted battery 23 or the like to power compatible with each of electric block elements and supplies the power to the electric block element. A power source management unit (POWER SC MANAGE) 26 is connected to the power source unit (POWER SC) 25. The power source management unit 26 is provided particularly to save power consumption and configured so as to turn on or turn off power supply to the electric elements of a wireless communication unit (COMM) 27 (mainly to the main CPU 8).

In the ECU 1, a speaker drive unit (SPK DRIVE) 29 is connected to the main CPU 8 through an audio processing unit (AUDIO) 28. The audio processing unit 28 serves as a block which performs a conversion process between an audio signal and an electric signal. The speaker drive unit 29 drives a speaker 30 provided in the vehicle 2 and transmits a speech signal (such as, e.g., a speech signal from a communication unit 37 (described later) of a telematics service sensor) to the speaker 30. In the ECU 1, a microphone drive unit (MIC DRIVE) 31 is also connected to the audio processing unit 28. The microphone drive unit 31 drives a microphone 32 provided in the vehicle 2, and detects a speech (e.g., a signal showing a speech made by a user). The audio processing unit 28 converts the speech signal to an electric signal and outputs the electric signal to the main CPU 8.

Figure 3:
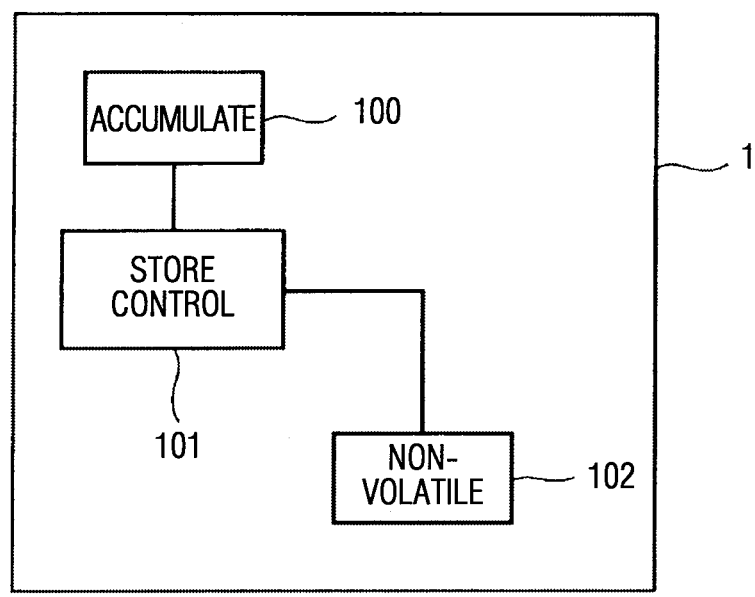
FIG. 3 is a block diagram conceptually showing a portion of the electric configuration of the electronic control unit.

The ECU 1 has the function of detecting the abnormality that has occurred in the ECU 1 and detecting abnormal disconnection from the communication line to another device (sensor, actuator, or another ECU) connected to the communication line. FIG. 3 shows a configuration which stores such diagnosis information (abnormal information) as a functional block diagram.

As shown in FIG. 3, an accumulation unit (ACCUMULATE) 100 is connected with a storage control unit 101, and a non-volatile storage unit (NON-VOLATILE) 102 is connected to the storage control unit (STORE CONTROL) 101.

The accumulation unit 100 is a functional unit implemented by, e.g., the execution of software by the main CPU 8. The storage control unit 101 also serves as a functional unit implemented through the execution of software by the main CPU 8. The non-volatile storage unit 102 is provided by the non-volatile memory 5 including the flash ROM 6 or the EEPROM 7.

In the present embodiment, as has been described using FIG. 1, consideration has been given to the exported vehicle 2. When the exported vehicle 2 is exported to a foreign country (country A) and actually used by the user M4, various communication services are provided in the form shown in FIG. 4.

As shown in FIG. 4, in the foreign country (country A), a base station 33 managed by a telecom carrier M6 is provided. The base station 33 is a wireless communication base station which is incommunicative with the ECU 1 during a period (specified period) during which the ECU 1 is in Japan or being transported. A communication unit 34 at the service center of the telecom carrier is connected to the base station 33, and a database 35 which stores various types of information is connected to the communication unit 34. The database 35 stores information of a subscriber who has signed up for a communication service with the telecom carrier M6.

When the user drives the vehicle 2 and approaches to the base station 33 by entering a communicable range in which the ECU 1 of the vehicle 2 can perform wireless communication with the base station 33, the ECU 1 starts communication with the communication unit 34 of the telecom carrier M6. The communication unit 34 is connected to a communication network 36 such as the Internet or a public phone line. When the subscriber information of the user of the vehicle 2 has been registered in the database 35, the user can enjoy an audio or data communication service through the communication network 36 of the telecom carrier M6 in the country A or the like.

The communication unit 37 of the telematics service provider M7 is also connected to the communication network 36. A database 38 is connected to the communication unit 37. The database 38 stores information of a subscriber who has signed up for an automobile telematics service.

When the user is able to enjoy the audio or data communication service provided by the telecom carrier M6 as described above, the ECU 1 becomes communicative with the communication unit 37 of the telematics service provider M7. Thereafter, when the subscriber information is registered in the database 38 in accordance with an instruction from the user, the user can enjoy the telematics service.

Figure 5:
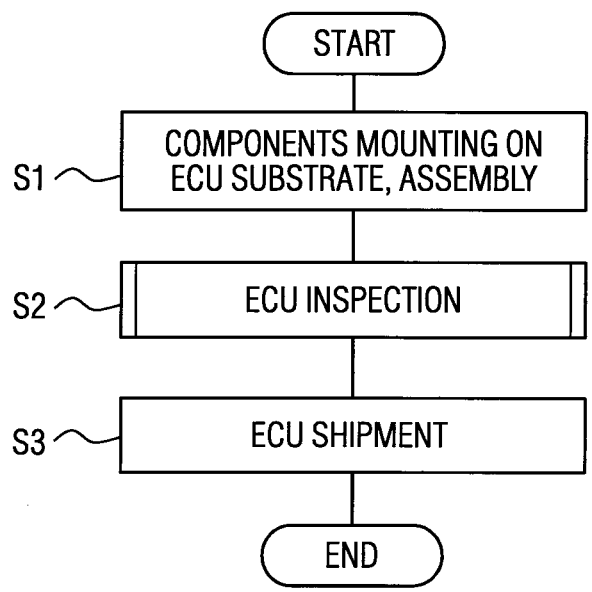
FIG. 5 is a flow chart schematically showing a flow from component assembly to component shipment by a component maker.

A detailed description will be given of a system including the electric configuration blocks each having the content described above along the flow shown by the distribution channel in FIG. 1. When a state has shifted along the marketing channel, in the non-volatile memory 5 of the ECU 1, the main CPU 8 changes the operation histories stored in the non-volatile memory 5. The operation histories can be divided into a normal operation history (e.g., addition of 1), a specified operation history (e.g., addition of 1001), and an abnormal operation history (e.g., addition of 10001). Each of the operation histories has been weighted depending on the type of the operation history and is cumulatively added when the corresponding operation is carried out. Specifically, cumulative addition (e.g., addition) of the operation histories is performed by changing a corresponding digit assigned to the operation history. Note that, here, the example in which the operation histories are subjected to sequential addition is shown. However, the case where subtraction is performed from a predetermined value may also be included in cumulative addition. FIG. 5 schematically shows works carried out by the component maker M1. In the component maker M1, various components such as an integrated circuit and electronic components are mounted on an ECU substrate (not shown). The substrate on which the components are mounted is contained in the casing of the ECU 1 so that the ECU 1 is assembled (S1). Thereafter, the ECU 2 is inspected (S2) and then shipped (S3).

Figure 6:
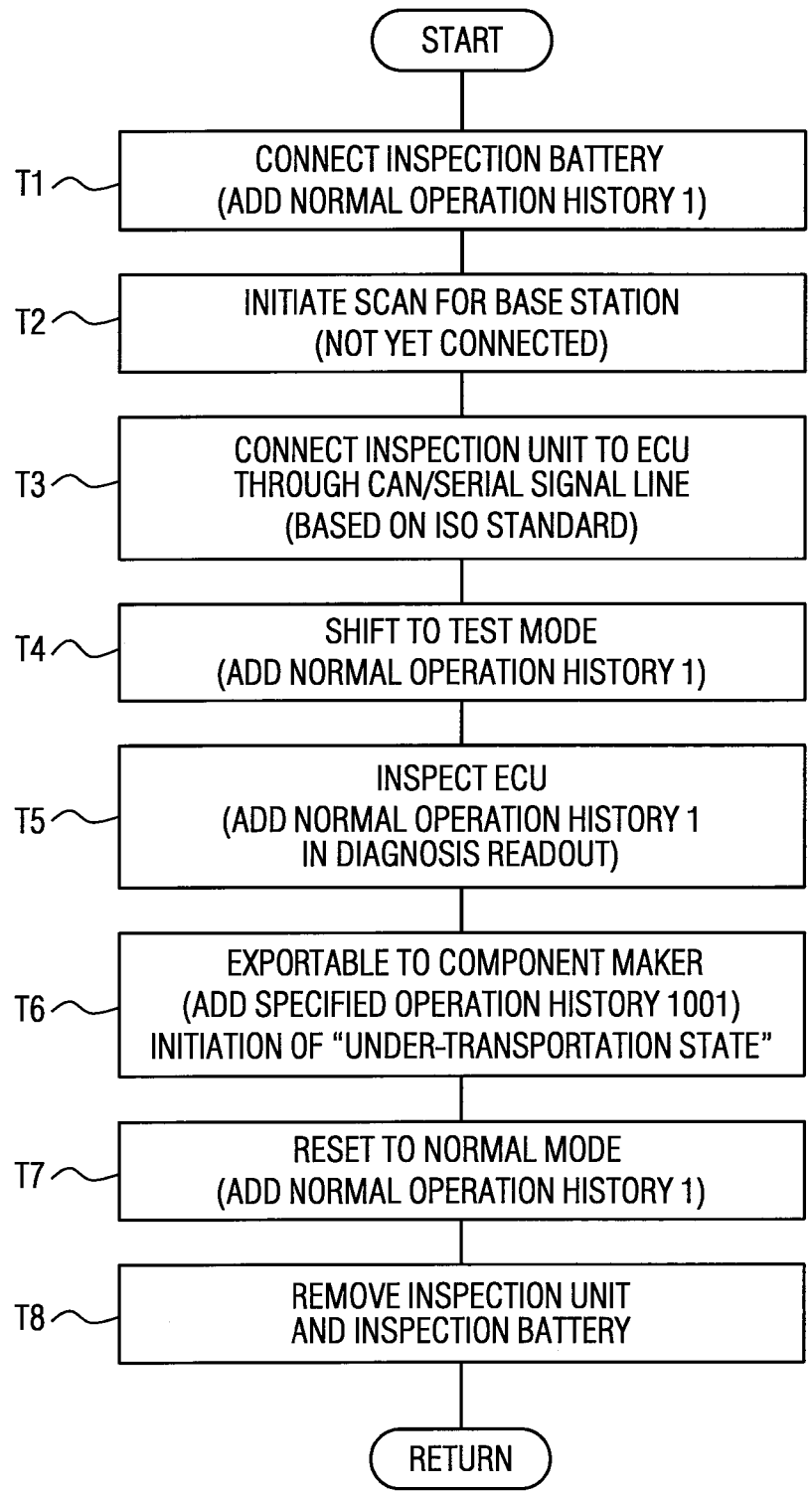
FIG. 6 is a flow chart showing the content of an inspection process for the components.

FIG. 6 shows the details of an inspection process in step S2. As shown in FIG. 6, an inspection is performed by connecting an inspection battery power source (not shown) to the ECU 1 (T1). When the inspection battery power source is connected to the ECU 1, the main CPU 8 cumulatively adds the normal operation history (e.g., 1) to an initial value stored in the non-volatile memory 5.

When the ECU 1 is normally operating, power is supplied from the power source unit 25 to the main CPU 8 through the power source management unit 26 so that the wireless transmission reception unit 10 starts to scan the external base station 33 (T2). However, when the inspection is performed in, e.g., Japan and is not performed in the country A (foreign country), even if the base station 33 in the country A is scanned, communication cannot be performed. Then, in the component maker M1, to inspect the ECU 1, the inspector connects the inspection unit 22 to the ECU 1 through a CAN or a serial signal line.

The inspector operates the inspection unit 22 to transmit a command from the inspection unit 22 to the ECU 1 and thus shift the ECU 1 into a test mode (T4). When the ECU 1 is shifted into the test mode, the main CPU 8 cumulatively adds 1 indicating the normal operation history to the cumulative value stored in the non-volatile memory 5.

After the shift into the test mode, the inspector performs the inspection (T5). At this time, the main CPU 8 reads, from the non-volatile memory 5 in which diagnosis codes are recorded, the corresponding diagnosis code and, in response to a command from the inspection unit 22, the corresponding diagnosis code is read out. Note that, when the reading of the diagnosis code is carried out, the CPU 8 also cumulatively adds 1 indicating the normal operation history to the cumulative value stored in the non-volatile memory 5.

In this case, the external inspection unit 22 can determine whether or not abnormality has occurred in the ECU 1 to allow the inspector to identify the presence or absence of the abnormality. When an abnormality has been determined to be occurred in the component maker M1, the ECU 1 is repaired and thus the abnormal state is eliminated.

When the inspection of the ECU 1 is ended in the component maker M1 and the ECU 1 is in an exportable state, the inspection unit 22 cumulatively adds, to the cumulative value stored in the non-volatile memory 5 of the ECU 1, 1001 indicating the specified operation history, which corresponds to the state of shipment from the component maker M1 (T6). The inspection unit 22 further stores, in the non-volatile memory 5, an information that indicates a state shift of the ECU 1 into "under-transportation state".

Then, the inspection unit 22 resets the ECU 1 from the inspection mode into the normal mode (T7). When reset to the normal mode, the ECU 1 cumulatively adds 1 indicating the normal operation history to the cumulative value stored in the non-volatile memory 5. In the component maker M1, the inspection unit 22 and the inspection battery power source are removed from the ECU 1, and the inspection is ended. When the inspection is ended, the ECU 1 is shipped from the component maker M1 to the vehicle maker M2.

Figure 7:
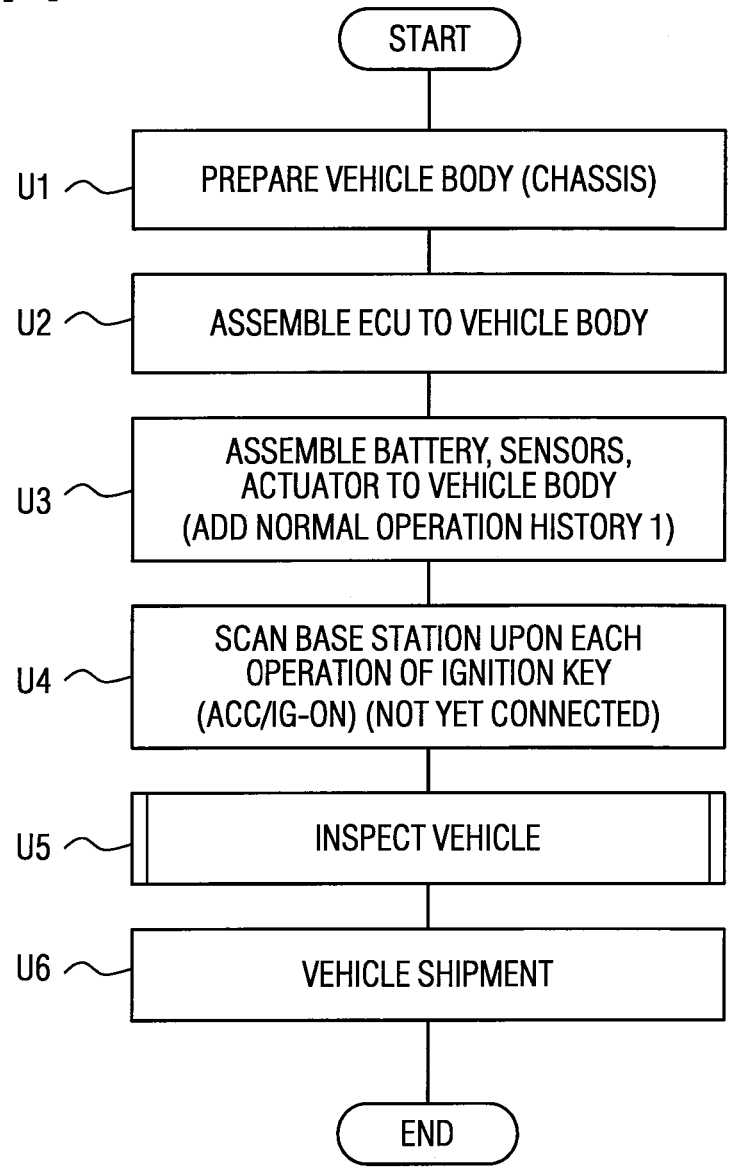
FIG. 7 is a flow chart schematically showing a flow from vehicle assembly to vehicle shipment by a vehicle maker.

In the vehicle maker M2, the vehicle 2 is assembled. FIG. 7 shows an example of the flow. As shown in FIG. 7, in the vehicle maker M2, a vehicle body is prepared (U1), the ECU 1 is assembled to the vehicle body 3 (U2), and various components such as a battery, various sensors, an actuator, and an engine are assembled to the vehicle body 3 (U3). Here, when the various components are assembled in the state where the ECU 1 has been activated, the main CPU 8 cumulatively adds 1 indicating the normal activation history to the cumulative value stored in the non-volatile memory 5.

When various inspections are performed in the vehicle maker M2 (U5), or a turning on (ON) of an accessory signal (ACC) or an ignition key corresponding to an ignition key operation is received during a driving of the vehicle 2, the ECU 1 scans the base station 33 (U4). At this time also, when, e.g., the inspection is performed in Japan and is not performed in the country A (foreign country), even if the base station 33 in the country A is scanned, communication cannot be performed with the base station 33. After ending the inspection of the vehicle 2, the vehicle maker M2 ships the vehicle 2 (U6).

Figure 8:
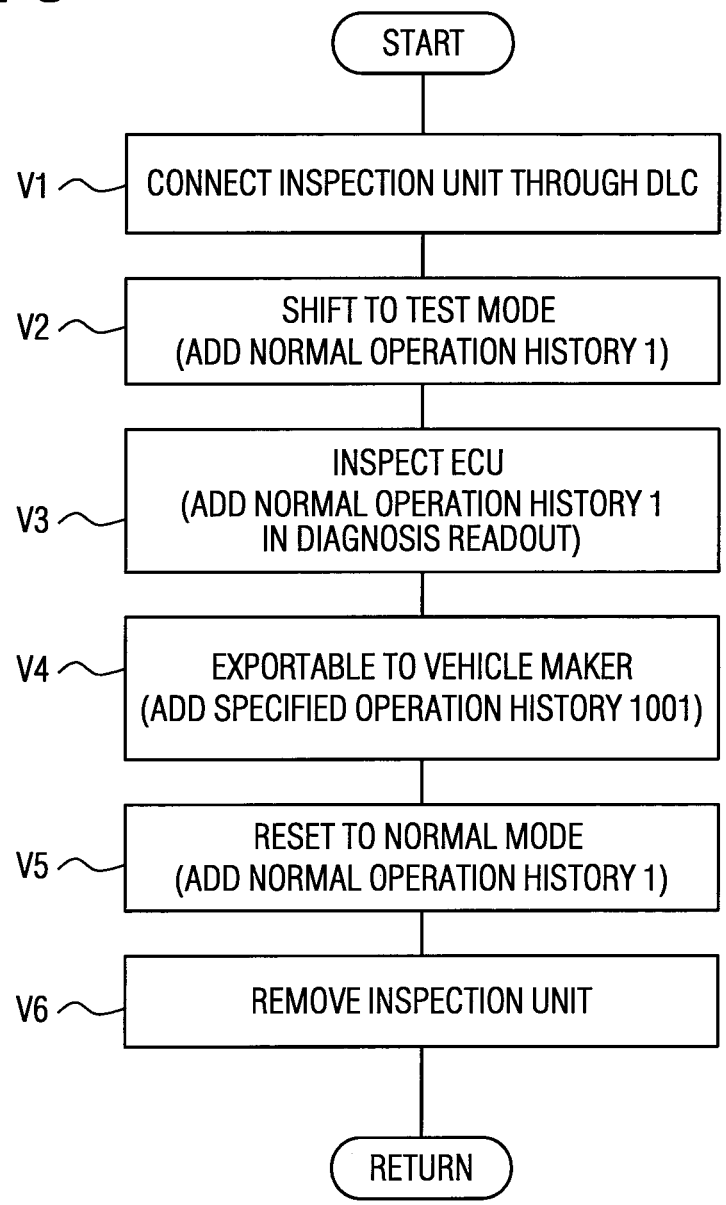
FIG. 8 is a flow chart schematically showing the content of an inspection process for the vehicle.

FIG. 8 shows the details of the vehicle inspection process. In the vehicle maker M2, the inspection unit 22 is connected to the ECU 1 mounted in the vehicle 2 through a DLC (data link connector) (V1). Then, the inspection unit 22 shifts the ECU 1 into a test mode (V2). When the ECU 1 is shifted into the test mode, the main CPU 8 cumulatively adds 1 indicating the normal operation history to the cumulative value stored in the non-volatile memory 5.

Then, the inspector performs the inspection of the ECU 1 using the inspection unit 22 (V3). When the inspection unit 22 is connected to the ECU 1 to start the inspection, the main CPU 8 reads a diagnosis code from the non-volatile memory 5. In response to a command from the inspection unit 22, the diagnosis code is readout by the main CPU 8 is output the external inspection unit 22. Note that, in the reading process also, the main CPU 8 cumulatively adds 1 indicating the normal operation history to the cumulative value stored in the non-volatile memory 5.

When the inspector in the vehicle maker M2 has determined that the vehicle 2 can be shipped, the vehicle maker M2 cumulatively adds the specified operation history indicating the reading out of a product number to the cumulative value stored in the non-volatile memory 5. At this time, the inspection unit 22 transmits a command for "shipment stage" to the ECU 1 to cause the main CPU 8 to cumulatively add 1001 indicating the specified operation history to the cumulative value stored in the non-volatile memory 5.

When the inspection is ended, the inspection unit 22 transmits a command to the ECU 1 to reset the ECU 1 to the normal mode (V5). When reset to the normal mode, the ECU 1 cumulatively adds 1 indicating the normal operation history to the cumulative value stored in the non-volatile memory 5. Then, in the vehicle maker M2, the inspection unit 22 is removed from the ECU 1 to end the inspection. When the inspection is ended, the vehicle 2 is transported from the vehicle maker M2.

When the exporter M3 transports the vehicle 2 over the sea, the exporter M3 drives the vehicle 2. At such a stage also, the main CPU 8 scans the base station 33 in response to an operation of turning ON of the ignition key (ACC/IG-ON) (W1). However, since communication connection to the base station 33 cannot be established during the transportation in Japan or from Japan to the country A, a time out is called to end communication.

When the vehicle 2 arrives at the country A, the dealer M5 sells the vehicle 2 to the user M4. Then, the user drives the vehicle 2 and to a place adjacent to the base station 33 so that the ECU 1 becomes communicative with the base station 33. As a result, the main CPU 8 of the ECU 1 is able to initiate communication with the base station 33 by the wireless transmission reception unit 10 (W2). Note that, after becoming communicative with the base station 33, the main CPU 8 of the ECU 1 may disable a subsequent cumulative addition of the operation history. This is because, when the ECU 1 has become communicative with the base station 33, the ECU 1 can acquire time information through communication with the base station 33. As a result, the main CPU 8 can specify the time when abnormality occurred. That is, the main CPU 8 can associate the diagnosis code corresponding to the occurrence of the abnormality with time information and store the diagnosis code and the corresponding time information in the non-volatile memory 5. In this case, it is no longer necessary to cumulatively add the operation history to the cumulative value.

However, there is no particular need to stop cumulative addition of the operation history. The operation history may also be cumulatively added thereafter when an inspection, repair, or the like is performed.

When the ECU 1 has become communicative with the base station 33, the ECU 1 is able to communicably connect to the communication unit 34 managed by the telecom carrier M6 (W3). When the sign-up for a communication service is completed by an operation by the user, the user can enjoy the audio or data communication service provided by the telecom carrier M6. At this time, the main CPU 8 of the ECU 1 cancels the "under-transportation state" described above and establishes an "under-service state" in the non-volatile memory 5. This state shift allows a use of the full function of the main CPU 8 of the ECU 1, such as audio or data communication (W4).

In the process including and subsequent to step W2, when the user normally uses the vehicle 2, time information can be obtained every time when communication is performed with the communication unit 34. Accordingly, in the ECU 1, it is possible to record the time when abnormality is occurred in the non-volatile memory 5 or the like.

At the time of the checkup, maintenance, or repair of the vehicle 2, the user leaves the vehicle 2 to the dealer M5 (W6). At this time, the dealer M5 performs an inspection using the inspection unit 22 and repairs the inside of the vehicle 2. For example, when the inspection unit 22 transmits an initialization command to the ECU 1 to initialize the information stored in the ECU 1, the main CPU 8 erases all the operation histories, diagnosis codes, and the like stored in the non-volatile memory 5.

Figure 10:
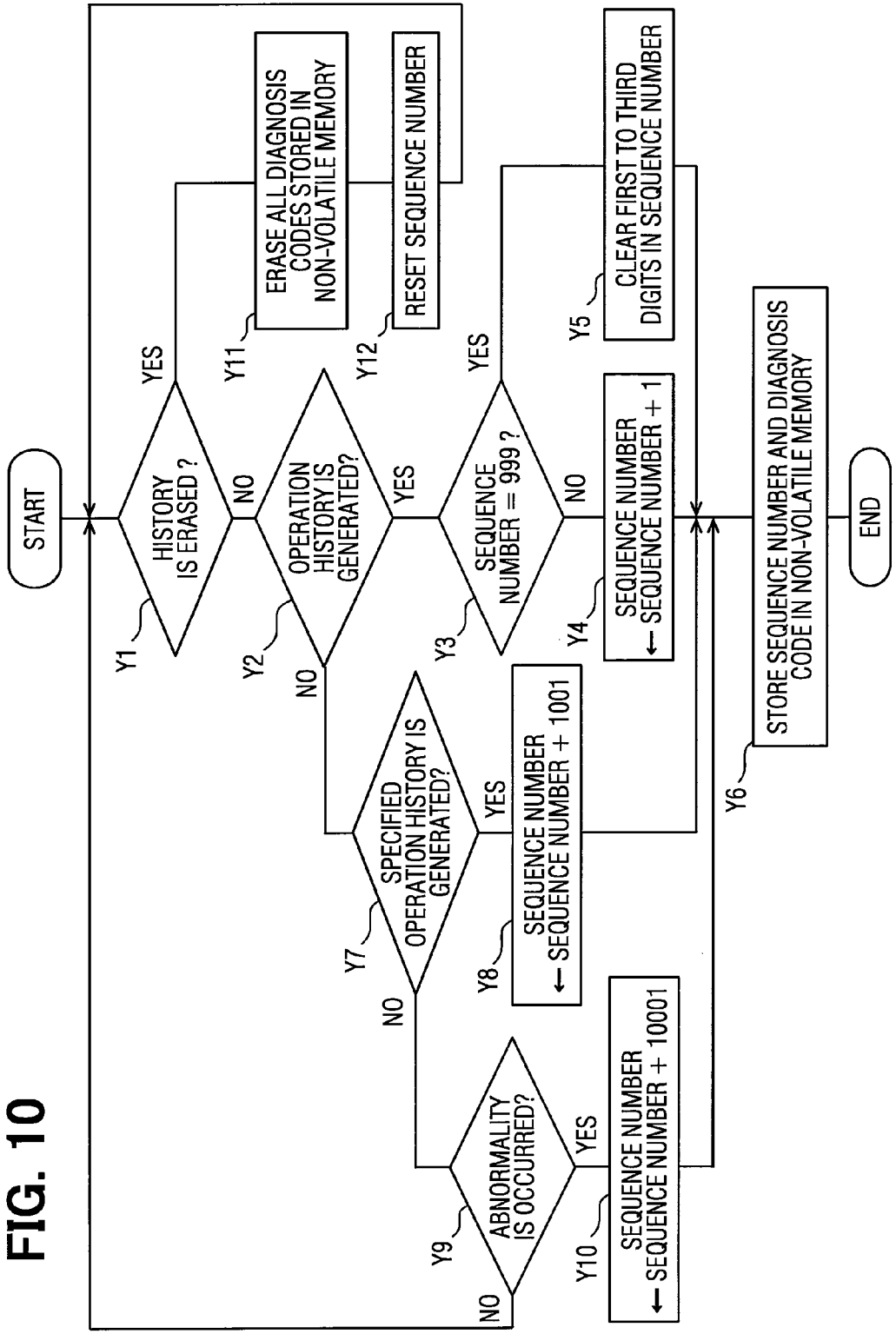
FIG. 10 is a flow chart showing a cumulative addition method for a sequence number.

Referring to FIG. 10, a description will be given of a sequential flow of these processes based mainly on the storage content of the non-volatile memory 5 of the ECU 1. When a trigger causing the normal operation history is generated when one of the conditions described above is satisfied (Y2: YES), the main CPU 8 of the ECU 1 increments (+1) the sequence number of the operation histories (Y4) on the condition that the incremented sequence number has only three digits (0 to 998) (Y3: NO).

However, when determining that the incremented sequence number has a digit higher in order than the third digit from the lowest digit (Y3: YES), all the three digits of the sequence number are cleared (=0) (Y5). That is, the sequence number having three digits is sequentially incremented starting from the lowest digit. For the normal operation history, the lowest digit and the second and third digits from the lower digit are used, but the fourth and higher-order digits are not used. This is because the fourth and higher-order digits have been assigned to other types of operation histories.

When a trigger causing the specified operation history is generated (Y7), the main CPU 8 of the ECU 1 adds 1001 to the sequence number of the operation histories. That is, when the trigger causing the specified operation history is generated, the trigger causing the specified operation history performs a numerical value increase at the fourth digit (changes the numerical value), while serving also as the trigger causing the normal operation history to increment (+1) the sequential number. That is, the "specified operation history" has been assigned to the fourth digit from the lowest digit in the operation history numerical value.

When a trigger causing an abnormal state is generated (Y9), the main CPU 8 of the ECU 1 adds 10001 to the sequential number of the operation histories, and stores a diagnosis code indicating the abnormal state in association with the sequence number in step Y6, and ends the current process. That is, when the trigger causing the abnormal state is generated, the trigger causing the abnormal state performs a numerical value increase at fifth digit from the lowest digit (changes the numerical value), while serving also as the trigger causing the normal operation history to increment (+1) the sequence number. That is, the "occurrence of abnormality" has been assigned to the fifth digit from the lowest digit in the operation history numerical value.

When the history of the sequence number is erased by an operation by the inspector or repairer (Y1: YES), all the diagnosis codes stored in the non-volatile memory 5 are erased (Y11) and the sequence number is reset (Y12). In this manner, the sequence number is cumulatively added and sequentially updated, together with the diagnosis codes, in the non-volatile memory 5.

The dealer M5 observes the updated sequence number to analyze the occurrence timing of abnormality. FIG. 11 shows a flow for specifying the occurrence timing of the abnormal state. For example, the dealer M5 connects the inspection unit 22 to the ECU 1 through the DLC (data link connector) (X1 in FIG. 11) and shifts the ECU 1 into the inspection mode (X2 in FIG. 11).

The inspection unit 22 reads out the sequence number and diagnosis codes stored in the non-volatile memory 5 (X3 in FIG. 11). Then, the inspection unit 22 reads the fourth digit from the lowest digit in the sequence number in which the fifth digit from the lowest digit has been changed (X4 in FIG. 11) and determines the occurrence timing of the abnormality on the basis of the value in the fourth digit from the lowest digit (X5 to X8 in FIG. 11).

For example, when the fourth digit from the lowest digit is "0" in the sequence number whose fifth digit from the lowest digit is "1", the inspection unit 22 determines that the abnormality is occurred in the component maker M1 (X5). FIG. 12 shows the data recorded in the non-volatile memory 5 when the abnormality occurred in the component maker M1. Note that the sequence number and the diagnosis code each shown in FIG. 12 correspond to information stored in the non-volatile memory 5. By contrast, "Added Value" and "History" in FIG. 12 are shown for easier understanding of the description and shows information which may be or need not be recorded in the non-volatile memory 5. Note that, to reduce the memory region being used in the non-volatile memory 5, "Added Value" and "History" need not be recorded.

In the recorded data shown in FIG. 12, an abnormal state occurred before 1001 indicating the specified operation history corresponding to "Shipment from Component Maker" is cumulatively added (step T6 in FIG. 6). Consequently, at the timing when the fifth digit from the lowest digit changed from "0" to "1", the fourth digit from the lowest digit is "0" and it is possible to roughly determine that the abnormality is occurred in the component maker M1. Note that, at the timing when the fifth digit from the lowest digit is changed, the diagnosis code ("DIGX1") indicating the cause of the abnormality was correspondingly recorded. This allows the external inspection unit 22 to identify the cause of the abnormality.

Note that, as the diagnosis codes, individual codes have been assigned in advance to the different causes of abnormality such that, e.g., "DIGCB" is assigned to disconnection of an antenna in the wireless transmission reception unit 10 and "DIGC5" is assigned to disconnection of a communication line in the emergency report switch 20. By reading out the diagnosis code, the inspection unit 22 can immediately identify the cause of abnormality.

When the fourth digit from the lowest digit was "1" at the timing when the fifth digit from the lowest digit changed from "0" to "1", the inspection unit 22 determines that the abnormality is occurred in the vehicle maker M2 (X6 in FIG. 11). FIG. 13 shows the data recorded in the non-volatile memory 5 when the abnormality occurred in the vehicle maker M2. In the recorded data shown in FIG. 13, the abnormality is occurred after 1001 indicating the specified operation history corresponding to "Shipment from Component Maker" was cumulatively added (step T6 in FIG. 6) and before 1001 indicating the specified operation history corresponding to "Shipment from Vehicle Maker" was cumulatively added (step V4 in FIG. 8).

Consequently, when the fifth digit from the lowest digit is changed from "0" to "1" and the fourth digit from the lowest digit was "1" at this time, it is possible to roughly determine that the abnormality occurred in the vehicle maker M2. Since the diagnosis code ("DIGX2") was recorded in the same manner as described above, the cause of the abnormality can also be identified.

Figure 9:
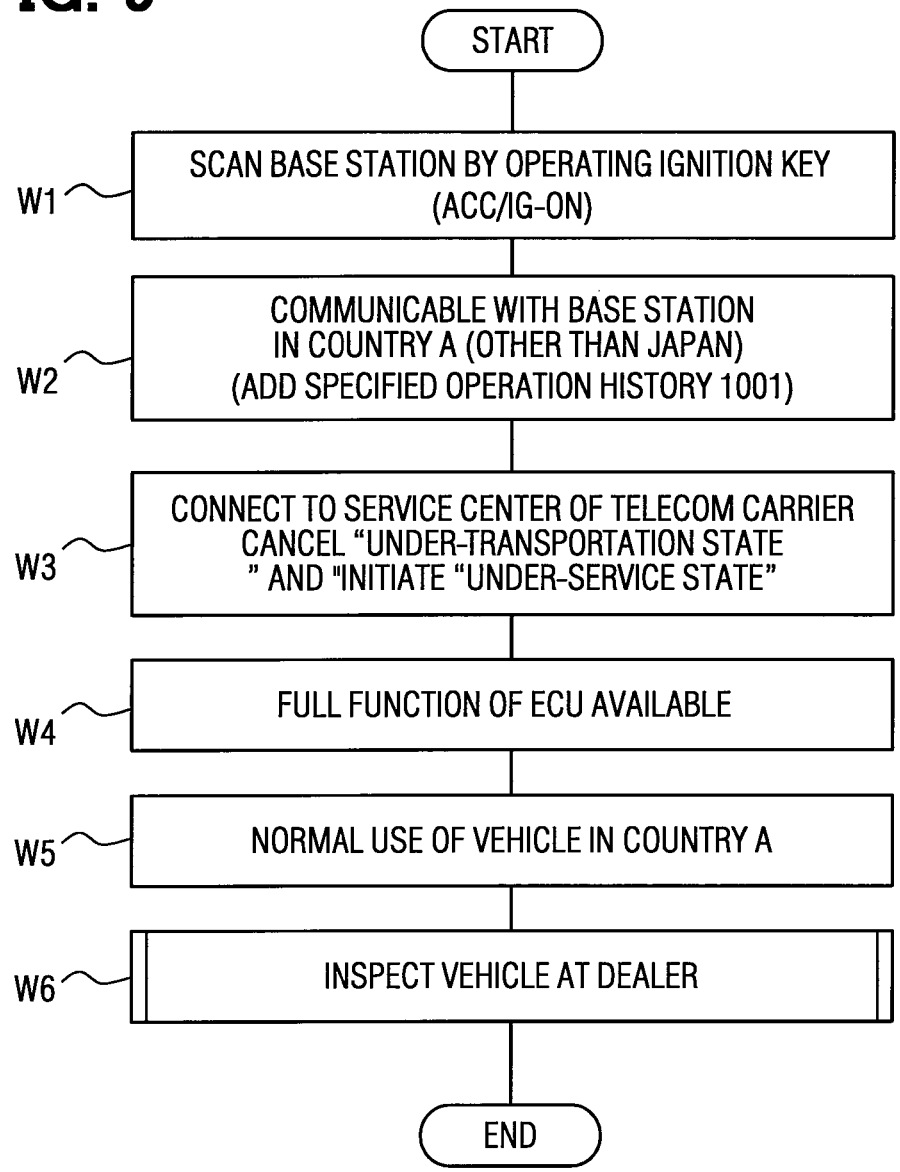
FIG. 9 is a flow chart schematically showing a flow from vehicle transportation to an inspection by a dealer through the normal use of the vehicle.

When the fourth digit from the lowest digit is "2" in the sequence number whose fifth digit from the lowest digit is "1", the inspection unit 22 determines that the abnormality is occurred during the export of the vehicle 2 by the exporter M3 (X7 in FIG. 11). FIG. 14 shows the data recorded in the non-volatile memory 5 when the abnormality occurred during the export. In the recorded data shown in FIG. 14, the abnormality is occurred after 1001 indicating the specified operation history corresponding to "Shipment from Vehicle Maker" was cumulatively added (step V4 in FIG. 8) and before 1001 showing the specified operation history corresponding to "Initiation of Communication" was cumulatively added (step W2 in FIG. 9). Consequently, at the timing when the fifth digit from the lowest digit is changed from "0" to "1", the fourth digit from the lowest digit is "2" and it is possible to determine that the abnormality occurred while the exporter M3 handled the vehicle 2. Since the diagnosis code was recorded in the same manner as described above, the cause of the abnormality can also be identified.

When the fourth digit from the lowest digit is "3" in the sequence number whose fifth digit from the lowest digit is "1", the inspection unit 22 determines that abnormality occurred during the normal use (X8 in FIG. 11). FIG. 15 shows the data recorded in the non-volatile memory 5 when the abnormality occurred during the normal use. When reference is made to the recorded data shown in FIG. 15, after 1001 showing the specified operation history 1001 corresponding to "Initiation of Communication" was cumulatively added (step W2 in FIG. 9), the abnormality occurred.

As a result, at the timing when the fifth digit from the lowest digit changed from "0" to "1" and the fourth digit from the lowest digit was "3" at this time, it is possible to determine that the abnormality occurred during the normal use of the vehicle 2. Since the diagnosis code was recorded in the same manner as described above, the cause of the abnormality can also be identified.

FIG. 16 shows an example in which multiple types of abnormalities simultaneously occurred. In the vehicle 2, an abnormality may occur by multiple times. Every time abnormality has occurred, a numerical value 10001 corresponding to (indicating) the occurrence of the abnormality is cumulatively added (Y10 in FIG. 10). As shown in FIG. 16, at the timing when the fifth digit from the lowest digit changed from "0" to "1", the fourth digit from the lowest digit was "2" and it is possible to determine that the abnormality is occurred while the vehicle 2 was handled by the exporter M3. At the timing when the fifth digit from the lowest digit is changed from "1" to "2", the fourth digit from the lowest digit was "3" and it is possible to determine that the abnormality is occurred during normal use by the user M4. In association with such abnormal states, respective diagnosis codes ("DIGX5" and "DIGX6") are recorded. Accordingly, by performing analysis while checking the diagnosis codes, the causes of the abnormalities can be identified in detail. In addition, it is also possible to easily specify an occurrence order of the abnormalities. As described above, the number of "Specified Operation Histories" is limited to a predetermined number (which is 3 in the present embodiment). Consequently, no carry occurs as a result of the cumulative addition of the specified operation histories.

As described above, according to the present embodiment, when the ECU 1 can sense the abnormality occurred in the vehicle 2, the main CPU 8 cumulatively adds the numerical value (10001) corresponding to the occurrence of the abnormality and stores the result of the cumulative addition in the non-volatile memory 5 in association with the diagnosis code.

As a result, the external inspection unit 22 can easily identify the occurrence timing of the abnormality by reading the timing when the numerical value corresponding to the occurrence of the abnormality was cumulatively added in the operation histories stored in the non-volatile memory 5. Thus, the occurrence timing of the abnormality can be easily identified without providing a time keeping function such as a timer. In addition, the ECU 1 can be used even in a situation in which a time keeping function cannot be used. Moreover, when the multiple numerical values corresponding to the occurrence of abnormalities were cumulatively added to the operation histories, by referring to the cumulative total values of the operation histories before and after each cumulative addition timing of the abnormality, the occurrence order of the abnormalities can be easily be identified from the outside.

Since the normal operation history (the lowest digit to the third digit, which correspond to a first predetermined digit), the specified operation history (the fourth digit, which corresponds to a third predetermined digit), and the abnormality occurrence history (the fifth digit, which corresponds to a second predetermined digit) have been weighted by, e.g., assigning the respective digits to the normal operation history, the specified operation history, and the abnormality occurrence history, respectively, the histories stored in the non-volatile memory 5 can more easily be identified from the outside. That is, when a log is checked, abnormal portions can be promptly and easily specified.

Other Embodiments

The present disclosure is not limited to the embodiments described above and can be, e.g., modified or expanded as follows. The embodiment described above has shown the form in which the sequence number is represented as a decimal numerical number. However, the decimal radix can be changed to various radices such as the octal, hexadecimal, and binary radices. That is, any radix can be used as long as each of the normal operation history, the specified operation history, and the abnormal state occurrence history is assigned to any of the digits.

The foregoing embodiment has also shown the form in which the numeral value corresponding to the occurrence of abnormality is 10001 and the occurrence of abnormality is assigned to the fifth digit from the lowest digit. Further, the occurrence of abnormality may be weighted without being assigned to any particular one of the digits. Also, the timing when the specified operation history may be cumulatively added not limited to the timing shown in each of the foregoing embodiments. The present disclosure has shown the form in which the vehicle diagnosis apparatus is applied to the ECU 1 for emergency report use. However, the vehicle diagnosis apparatus is applicable to various vehicle components in each of which a means for controlling storage in the non-volatile memory 5 is mounted.

In the present embodiment, the electronic control unit 1 corresponds to the vehicle diagnosis apparatus. The non-volatile memory 5 including the flash ROM 6 or the EEPROM 7 corresponds to a non-volatile storage unit. The main CPU 8 corresponds to an accumulation unit, a storage control unit, and the non-volatile storage unit.

The foregoing disclosure includes the following modes.

The vehicle diagnosis apparatus 1 according to one aspect of the present disclosure includes an accumulation unit 8, 100 and a storage control unit 8, 101. The accumulation unit 8, 100 cumulatively adds a numerical value indicating a normal operation history of each normal operation made to a vehicle to a cumulative total value, which is initialized and has a predetermined number of digits, during a time period from an assembly of a vehicle component to an actual use of the vehicle. Then, the accumulation unit 8, 100 stores the cumulative total value to which the numerical value indicating each normal operation history is added in a non-volatile storage unit 5, 6, 7, 102. The storage control unit 8, 101, in response to an occurrence of an abnormality in the vehicle, stores a diagnosis code corresponding to the occurrence of the abnormality in the non-volatile storage unit 5, 6, 7, 102. The accumulation unit 8, 100 cumulatively adds a numerical value indicating the occurrence of the abnormality to the cumulative total value stored in the non-volatile storage unit 5, 6, 7, 102. The storage control unit 8, 101 stores, in the non-volatile storage unit 5, 6, 7, 102, the diagnosis code corresponding to the occurrence of the abnormality in association with the cumulative total value to which the numerical value indicating the occurrence of the abnormality is added.

In above-described vehicle diagnosis apparatus 1, the accumulation unit 8, 100 cumulatively adds the numerical value used to indicate the operation history corresponding to the normal operation during the period from the assembly of the vehicle component to the actual use of the vehicle, and the storage control unit 8, 101 stores the cumulative total value in the non-volatile storage unit 5, 6, 7, 102. Thus, by reading out the cumulative total value, it is possible to easily know the normal operation made to the vehicle during the period from the assembly of the component vehicle to the actual use of the vehicle from the outside.

When various abnormalities have occurred in the vehicle, the storage control unit 8, 101 also stores the diagnosis code corresponding to each abnormality in the non-volatile storage unit 5, 6, 7, 102. Thus, the occurrence of the abnormality can be easily identified from the outside. In addition, the accumulation unit 8, 100 cumulatively adds the numerical value corresponding to the abnormality occurrence to the cumulative total value of the operation histories stored in the non-volatile storage unit 5, 6, 7, 102, and the storage control unit 8, 101 stores the diagnosis code in association with the cumulative total value in the non-volatile storage unit 5, 6, 7, 102. Thus, a time when the numerical value corresponding to the abnormality occurrence was cumulatively added to the operation histories can be easily identified from the outside. Therefore, it is possible to easily identify the abnormality occurrence timing without providing a time keeping function, such as a timer to the vehicle diagnosis apparatus.

When multiple numerical values corresponding to multiple abnormality occurrences were cumulatively added to the operation histories, by referring to the cumulative total values of the operation histories before and after each cumulative addition timing, the occurrence order of the multiple abnormalities can be easily identified from the outside.

The accumulation unit 8, 100 cumulatively adds the numerical value indicating the normal operation history of the vehicle to a first predetermined digit of the cumulative total value and cumulatively adds the numerical value indicating the occurrence of the abnormality to a second predetermined digit of the cumulative total value. The first and the second predetermined digits are preliminarily set different from one another.

The accumulation unit 8, 100 cumulatively adds, to the cumulative total value, a numerical value indicating at least one specified operation history related to at least one of the assembly of the vehicle component, an assembly of the vehicle, an inspection of the vehicle, a transportation of the vehicle, or the actual use of the vehicle, and the accumulation unit 8, 100 stores the cumulative total value in the non-volatile storage unit 5, 6, 7, 102. The at least one specified operation history includes an operation history for receiving a command from an inspection unit 22 that is positioned outside of the vehicle and an operation history for initiating a communication with a base station 33 that is incommunicative with the vehicle for a specified time period.

The accumulation unit 8, 100 cumulatively adds the numerical value indicating the normal operation history corresponding to the normal operation made to the vehicle to a first predetermined digit of the cumulative total value. The accumulation unit 8, 100 cumulatively adds the numerical value indicating the occurrence of the abnormality to a second predetermined digit of the cumulative total value, and the second predetermined digit is preliminarily set different from the first predetermined digit. The accumulation unit 8, 100 cumulatively adds the numerical value indicating the specified operation history to a third predetermined digit of the cumulative total value which, the third predetermined digit is preliminarily set different from the first predetermined digit and the second predetermined digit.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle diagnosis apparatus, comprising:
   an accumulation unit cumulatively adding a numerical value indicating a normal operation history of each normal operation made to a vehicle to a cumulative total value, which is initialized and has a predetermined number of digits, during a time period from an assembly of a vehicle component to an actual use of the vehicle, the accumulation unit further storing the cumulative total value to which the numerical value indicating the normal operation history is added in a non-volatile storage unit; and
   a storage control unit, in response to an occurrence of an abnormality in the vehicle, storing a diagnosis code corresponding to the occurrence of the abnormality in the non-volatile storage unit, wherein
   the accumulation unit further cumulatively adds a numerical value indicating the occurrence of the abnormality to the cumulative total value stored in the non-volatile storage unit, and
   the storage control unit stores, in the non-volatile storage unit, the diagnosis code corresponding to the occurrence of the abnormality in association with the cumulative total value to which the numerical value indicating the occurrence of the abnormality is added.

2. The vehicle diagnosis apparatus according to claim 1, wherein
   the accumulation unit cumulatively adds the numerical value indicating the normal operation history of the vehicle to a first predetermined digit of the cumulative total value and cumulatively adds the numerical value indicating the occurrence of the abnormality to a second predetermined digit of the cumulative total value, and the second predetermined digit is preliminarily set different from the first predetermined digit.

3. The vehicle diagnosis apparatus according to claim 1, wherein the accumulation unit cumulatively adds, to the cumulative total value, a numerical value indicating at least one specified operation history related to at least one of the assembly of the vehicle component, an assembly of the vehicle, an inspection of the vehicle, a transportation of the vehicle, or the actual use of the vehicle, and the accumulation unit stores the cumulative total value in the non-volatile storage unit, and the at least one specified operation history includes an operation history for receiving a command from an inspection unit that is positioned outside of the vehicle and an operation history for initiating a communication with a base station that is incommunicative with the vehicle for a specified time period.

4. The vehicle diagnosis apparatus according to claim 3, wherein the accumulation unit cumulatively adds the numerical value indicating the normal operation history corresponding to the normal operation made to the vehicle to a first predetermined digit of the cumulative total value, the accumulation unit cumulatively adds the numerical value indicating the occurrence of the abnormality to a second predetermined digit of the cumulative total value, the second predetermined digit is preliminarily set different from the first predetermined digit, and the accumulation unit cumulatively adds the numerical value indicating the specified operation history to a third predetermined digit of the cumulative total value which, the third predetermined digit is preliminarily set different from the first predetermined digit and the second predetermined digit.

* * * * *